United States Patent
Zhang

(10) Patent No.: US 11,168,599 B2
(45) Date of Patent: Nov. 9, 2021

(54) METHOD OF OPERATING A DIESEL ENGINE AND DIESEL ENGINE WITH CHECKING OF NH3 CONCENTRATION

(71) Applicant: Vitesco Technologies GmbH, Hannover (DE)

(72) Inventor: Hong Zhang, Munich (DE)

(73) Assignee: VITESCO TECHNOLOGIES GMBH, Hanover (DE)

(*) Notice: Subject to any disclaimer, the term of this patent is extended or adjusted under 35 U.S.C. 154(b) by 0 days.

(21) Appl. No.: 16/755,298

(22) PCT Filed: Oct. 8, 2018

(86) PCT No.: PCT/EP2018/077244
§ 371 (c)(1),
(2) Date: Apr. 10, 2020

(87) PCT Pub. No.: WO2019/072725
PCT Pub. Date: Apr. 18, 2019

(65) Prior Publication Data
US 2020/0277885 A1    Sep. 3, 2020

(30) Foreign Application Priority Data

Oct. 13, 2017  (DE) .................... 10 2017 218 314.4

(51) Int. Cl.
*F01N 3/00*   (2006.01)
*F01N 3/20*   (2006.01)
(Continued)

(52) U.S. Cl.
CPC ........... *F01N 3/2066* (2013.01); *F01N 3/035* (2013.01); *F02M 26/06* (2016.02);
(Continued)

(58) Field of Classification Search
CPC .. F01N 3/035; F01N 3/2066; F01N 2560/026; F01N 2900/1616; F02M 26/06; F02M 26/07
(Continued)

(56) References Cited

U.S. PATENT DOCUMENTS 8,495,862 B2   7/2013  Levijoki et al. ................. 60/277
8,820,050 B2   9/2014  Dubkov et al. .................. 60/285
(Continued)

FOREIGN PATENT DOCUMENTS

DE   102014200092 A1   7/2014   ............... F01N 3/10
DE   102016222010 A1   6/2017   ............. F01N 3/021
(Continued)

OTHER PUBLICATIONS

German Office Action, Application No. 102017218314.4, 6 pages, dated Aut. 24, 2018.
(Continued)

*Primary Examiner* — Jason D Shanske
(74) *Attorney, Agent, or Firm* — Slayden Grubert Beard PLLC

(57) ABSTRACT

Various embodiments include a method of operating a diesel engine having an exhaust tract and an SCR-combined diesel particulate filter in the exhaust tract, wherein an aqueous urea solution is introduced into the exhaust tract, and an exhaust gas recirculation apparatus having an exhaust gas recirculation conduit branching off downstream of the SCR-combined diesel particulate filter for performing a low-pressure exhaust gas recirculation comprising: measuring an $NH_3$ concentration in exhaust gas downstream of the SCR-combined diesel particulate filter; and upon exceeding a threshold value of the measured $NH_3$ concentration, reducing the low-pressure exhaust gas recirculation rate based at least in part on the measured $NH_3$ concentration.

13 Claims, 2 Drawing Sheets

(51) Int. Cl.
*F02M 26/06* (2016.01)
*F01N 3/035* (2006.01)
*F02M 26/07* (2016.01)

(52) U.S. Cl.
CPC .... *F01N 2560/026* (2013.01); *F01N 2560/14* (2013.01); *F01N 2610/02* (2013.01); *F01N 2900/1616* (2013.01); *F02M 26/07* (2016.02)

(58) Field of Classification Search
USPC .......................................................... 60/286
See application file for complete search history.

(56) References Cited

U.S. PATENT DOCUMENTS

| | | | |
|---|---|---|---|
| 8,943,798 B2 | 2/2015 | Riffle et al. ................... 60/276 |
| 9,080,488 B2 | 7/2015 | Upadhyay et al. | |
| 9,429,059 B2 | 8/2016 | Riffle et al. | |
| 9,435,244 B1 | 9/2016 | Devarakonda | |
| 2011/0185707 A1 | 8/2011 | Upadhyay et al. ............. 60/274 |
| 2013/0263575 A1 | 10/2013 | Sun ................................ 60/274 |
| 2014/0123630 A1* | 5/2014 | Eckhoff ................. F02M 26/15 60/274 |
| 2014/0298778 A1 | 10/2014 | Riffle et al. ..................... 60/276 |
| 2016/0131003 A1* | 5/2016 | Kogo ....................... F01N 3/208 60/276 |
| 2017/0122168 A1* | 5/2017 | Angst .................... F01N 3/0842 |
| 2017/0175607 A1 | 6/2017 | De Smet et al. ................ 60/274 |
| 2018/0023440 A1* | 1/2018 | Cho ........................ F01N 3/021 60/274 |
| 2018/0163590 A1* | 6/2018 | Park ........................ F01N 3/2066 |
| 2018/0187583 A1* | 7/2018 | Smet .................... F02D 41/0065 |
| 2018/0216510 A1* | 8/2018 | Boerensen ............ F01N 3/2073 |

FOREIGN PATENT DOCUMENTS

| | | | |
|---|---|---|---|
| DE | 102016223558 A1 | 6/2017 | ............. F01N 3/021 |
| DE | 102017105252 A1 | 10/2017 | ............. F01N 3/18 |
| JP | 2015172339 A | 10/2015 | ............. F01N 3/02 |
| JP | 2016153605 A | 8/2016 | ............. B01D 53/94 |
| WO | 2019/072725 A1 | 4/2019 | ............. F01N 11/00 |

OTHER PUBLICATIONS

International Search Report and Written Opinion, Application No. PCT/EP2018/077244, 23 pages, dated Dec. 3, 2018.

* cited by examiner

METHOD OF OPERATING A DIESEL ENGINE AND DIESEL ENGINE WITH CHECKING OF NH3 CONCENTRATION

CROSS-REFERENCE TO RELATED APPLICATIONS

This application is a U.S. National Stage Application of International Application No. PCT/EP2018/077244 filed Oct. 8, 2018, which designates the United States of America, and claims priority to DE Application No. 10 2017 218 314.4 filed Oct. 13, 2017, the contents of which are hereby incorporated by reference in their entirety.

TECHNICAL FIELD

The present disclosure relates to internal combustion engines. Various embodiments include methods of operating a diesel engine having arranged in the exhaust tract of the diesel engine an SCR-combined diesel particulate filter in which an aqueous urea solution is introduced into the exhaust tract and an exhaust gas recirculation apparatus having an exhaust gas recirculation conduit branching off downstream of the SCR-combined diesel particulate filter for performing a low-pressure exhaust gas recirculation.

BACKGROUND

Diesel engines employ high-pressure exhaust gas recirculation (high-pressure EGR) and low-pressure exhaust gas recirculation (low-pressure EGR) to control $NO_x$ emissions. In high-pressure exhaust gas recirculation, the exhaust gas withdrawal is effected upstream of the exhaust gas aftertreatment while in low-pressure exhaust gas recirculation it is effected downstream of the exhaust gas aftertreatment. In the warm-up phase of the engine and the exhaust system and also during dynamic driving conditions the high-pressure exhaust gas recirculation is more heavily utilized. In other cases, the low-pressure exhaust gas recirculation finds greater use in order to reduce the $CO_2$ proportion at identical $NO_x$ reduction.

Furthermore, the exhaust gas systems of diesel engines increasingly employ a diesel particulate filter having an integrated SCR catalyst (SDPF). An SCR catalyst is a catalyst which performs a selective catalytic reduction. In the case of appropriate combination with a diesel particulate filter/appropriate integration the diesel particulate filter may comprise an SCR coating for example. In the method of selective catalytic reduction (SCR) an aqueous urea solution is continuously injected into the exhaust gas stream to reduce nitrogen oxides and form carbon dioxide and ammonia by hydrolysis. Ammonia reacts with the nitrogen oxides in the exhaust gas over the SCR catalyst/SCR-combined diesel particulate filter to afford elemental nitrogen $N_2$ and water.

Such SCR-combined diesel particulate filters are employed ever more often, in particular in combination with a downstream SCR catalyst in order to reduce emissions both during the warm-up phase of the engine and during low-load operation (town driving) and high-load operation (motorway driving). When a low-pressure exhaust gas recirculation is performed in combination with such an SCR-combined diesel particulate filter the exhaust gas recirculation conduit in this case typically branches off downstream of the SCR-combined diesel particulate filter. It is generally assumed that the ammonia formed in the SCR-combined diesel particulate filter is completely converted into nitrogen with the nitrogen oxides present in the exhaust gas so that ammonia can no longer pass into the branching exhaust gas recirculation conduit. However, under real driving conditions where the SCR-combined diesel particulate filter (SDPF) is hot (for example above 400° C.) or $NH_3$ is present in excessive amounts, ammonia is still present in the exhaust gas exiting the SCR-combined diesel particulate filter. At a high low-pressure exhaust gas recirculation rate a portion of the ammonia is then recirculated to the engine by the exhaust gas recirculation conduit and exits the engine again partially in the form of $NO_x$ and partially in the form of $NH_3$ (depending on engine load). This is undesired and leads to undesired emissions and elevated urea consumption.

U.S. Pat. No. 9,080,488 B2 describes a method of determining the passage of $NH_3$ and $NO_x$ through an SCR catalyst. This is performed using NOx sensors arranged upstream and downstream of the SCR catalyst. The corresponding signals from said sensors are processed to calculate the $NH_3$ and $NO_x$ concentrations downstream of the SCR catalyst.

U.S. Pat. No. 9,429,059 B2 describes a method wherein the $NO_x$ and $NH_3$ concentrations in the exhaust gas are determined using two NOx sensors.

It is also known to control a corresponding exhaust gas recirculation via a calibration with which correct emissions and correct urea dosage amounts in a defined driving cycle may be specified. However, under real driving conditions it is very difficult to specify a calibration which satisfies all conditions.

SUMMARY

The teachings of the present disclosure describe methods with which exhaust gas recirculation for emissions reduction is controllable particularly precisely. For example, some embodiment include measuring the $NH_3$ concentration in the exhaust gas downstream of the SCR-combined diesel particulate filter; and, upon exceeding a threshold value of the measured $NH_3$ concentration, reducing the low-pressure exhaust gas recirculation rate according to the measured $NH_3$ concentration.

For example, some embodiments include a method of operating a diesel engine (1) having arranged in the exhaust tract (2) of the diesel engine (1) an SCR-combined diesel particulate filter (4) in which an aqueous urea solution is introduced into the exhaust tract (2) and an exhaust gas recirculation apparatus having an exhaust gas recirculation conduit (11) branching off downstream of the SCR-combined diesel particulate filter (4) for performing a low-pressure exhaust gas recirculation comprising the following steps of: measuring the $NH_3$ concentration in the exhaust gas downstream of the SCR-combined diesel particulate filter (4); and upon exceeding a threshold value of the measured $NH_3$ concentration reducing the low-pressure exhaust gas recirculation rate according to the measured $NH_3$ concentration.

In some embodiments, a high-pressure exhaust gas recirculation rate of the diesel engine (1) is correspondingly increased.

In some embodiments, measurement of the $NH_3$ concentration in the exhaust gas is carried out using an $NH_3$ sensor (6).

In some embodiments, the $NH_3$ concentration in the exhaust gas is measured by performing storage determination of an SCR catalyst (5) arranged in the exhaust tract (2) downstream of the SCR-combined diesel particulate filter (4) in conjunction with a measurement from an $NO_x$ Sensor (10) arranged downstream of the SCR-combined diesel particulate filter (4).

In some embodiments, the $NH_3$ concentration in the exhaust gas is measured by performing a measurement with $NO_x$ sensors (10) downstream of the SCR-combined diesel particulate filter (4) and downstream of the SCR catalyst (5).

In some embodiments, the $NH_3$ concentration in the exhaust gas is measured during supply of the aqueous urea solution to the SCR-combined diesel particulate filter (4) or to the exhaust tract upstream thereof.

In some embodiments, for an exhaust tract (2) where a first urea solution dose is introduced into the exhaust tract (2) upstream and a second urea solution dose is introduced into the exhaust tract (2) downstream of the SCR-combined diesel particulate filter (4) the $NH_3$ concentration is measured and used to decide when and to what extent the delivery of the second urea solution dose is activated.

In some embodiments, the delivery of the first urea solution dose is reduced until the $NH_3$ concentration is below a first relatively high threshold value.

In some embodiments, when the $NH_3$ concentration is below a second relatively low threshold value the urea dosing amount is then increased with the first urea solution dose.

In some embodiments, the second urea solution dose is introduced according to an $NO_x$ sensor signal downstream of the SCR-combined diesel particulate filter (4).

In some embodiments, an $NO_x$ sensor signal downstream of the SCR catalyst (5) is used for controlling the additional urea solution dosing for the correct storage of $NH_3$ in the SCR catalyst (5).

As another example, some embodiments include a diesel engine (1) having arranged in the exhaust tract (2) of the diesel engine (1) an SCR-combined diesel particulate filter (4) in which an aqueous urea solution is introduced into the exhaust tract (2) and an exhaust gas recirculation apparatus having an exhaust gas recirculation conduit (11) branching off downstream of the SCR-combined diesel particulate filter (4) for performing a low-pressure exhaust gas recirculation, characterized in that it comprises means for measuring the $NH_3$ concentration in the exhaust gas downstream of the SCR-combined diesel particulate filter (4) and means for reducing the low-pressure exhaust gas recirculation rate according to the measured $NH_3$ concentration.

In some embodiments, there are means for correspondingly increasing the high-pressure exhaust gas recirculation rate. In some embodiments, the means for measuring the $NH_3$ concentration comprise an $NH_3$ sensor (6).

In some embodiments, an SCR catalyst (5) is arranged in the exhaust tract (2) downstream of the SCR-combined diesel particulate filter (4).

In some embodiments, there is a first urea solution metering means upstream and a second urea solution metering means downstream of the SCR-combined diesel particulate filter (4).

In some embodiments, there is an $NO_x$-Sensor (10) downstream of the SCR-combined diesel particulate filter (4) and downstream of the SCR catalyst (5).

BRIEF DESCRIPTION OF THE DRAWINGS

The teachings herein are hereinbelow elucidated in detail with reference to two exemplary embodiments in conjunction with the drawing. In the figures.

DETAILED DESCRIPTION

Figure 1:
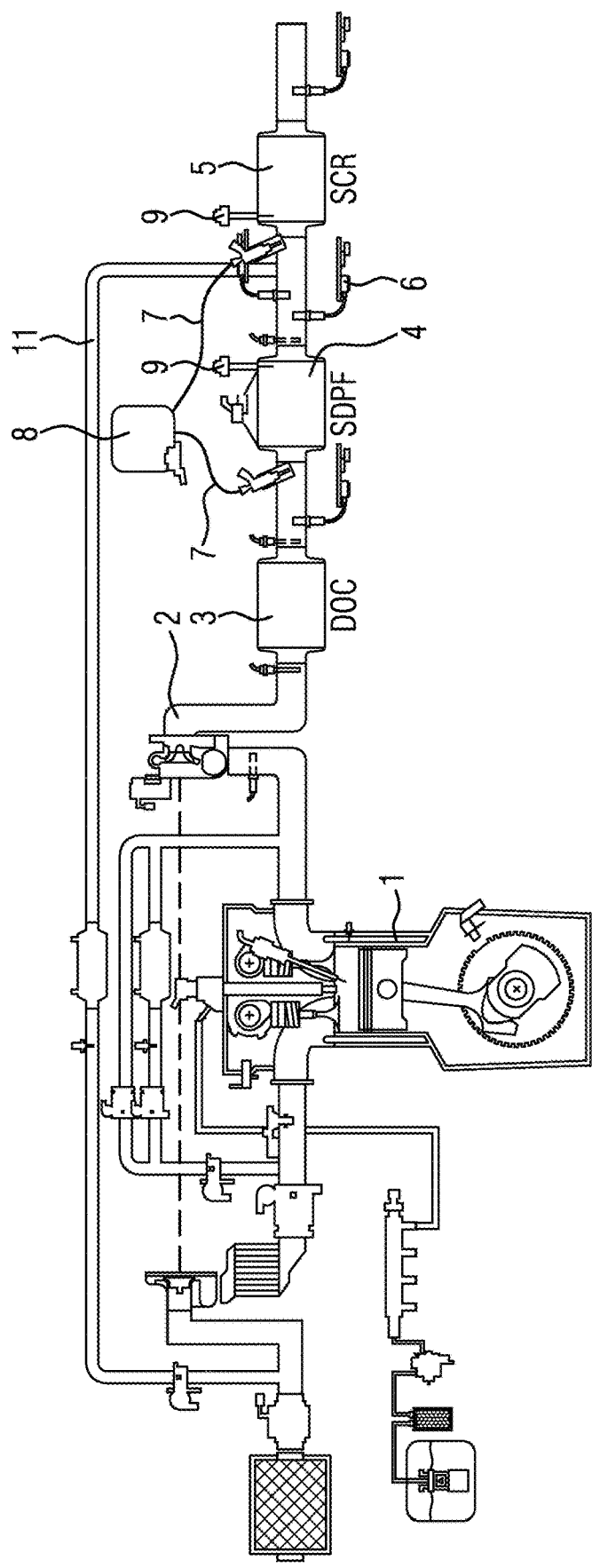
FIG. 1 shows a schematic representation of a diesel engine having an exhaust tract incorporating teachings of the present disclosure.

Various methods incorporating teachings of the present disclosure perform additional low-pressure exhaust gas recirculation rate control according to the $NH_3$ concentration in the exhaust gas. The higher the $NH_3$ concentration in the exhaust gas stream exiting the SCR-combined diesel particulate filter, the lower the low-pressure exhaust gas recirculation rate. This makes it possible to optimize urea consumption. The negative effects of $NH_3$ on the exhaust gas recirculation or the air cooler can also be reduced.

In some embodiments, a high-pressure exhaust gas recirculation rate of the diesel engine is correspondingly increased with the reduction in the low-pressure exhaust gas recirculation rate. Measurement of the $NH_3$ concentration in the exhaust gas may be carried out using an $NH_3$ sensor. This sensor is arranged between the SCR-combined diesel particulate filter and the branching point of the exhaust gas recirculation conduit.

In some embodiments, when an additional SCR catalyst is used downstream of the SCR-combined diesel particulate filter and downstream of the branching point of the exhaust gas recirculation conduit so that the ammonia proportion in the exhaust gas which does not pass into the exhaust gas recirculation conduit may be converted into nitrogen in the subsequent SCR catalyst. When such an SCR catalyst is provided the $NH_3$ concentration in the exhaust gas may then be measured by performing a storage determination of this SCR catalyst arranged in the exhaust tract downstream of the SCR-combined diesel particulate filter in conjunction with a measurement from an $NO_x$ sensor arranged downstream of the SCR-combined diesel particulate filter. The storage determination of the SCR catalyst may be performed using an antenna sensor.

In some embodiments, the $NH_3$ concentration in the exhaust gas may be measured by performing a measurement with $NO_x$ sensors downstream of the SCR-combined diesel particulate filter and downstream of the SCR catalyst. It will be appreciated that it is always measurement of the $NH_3$ concentration downstream of the SCR-combined diesel particulate filter and upstream of the branching point of the exhaust gas recirculation conduit that is concerned.

The corresponding $NH_3$ concentration in the exhaust gas may be measured during supply of the aqueous urea solution to the SCR-combined diesel particulate filter or into the exhaust tract upstream thereof. When an additional SCR catalyst is present measurement is preferably also carried out during supply of the urea solution to this SCR catalyst or the exhaust tract upstream thereof.

In some embodiments, delivery of two urea solution dosings upstream and downstream of the SCR-combined diesel particulate filter is concerned here. For an exhaust tract where a first urea solution dose is introduced into the exhaust tract upstream and a second urea solution dose is introduced into the exhaust tract downstream of the SCR-combined diesel particulate filter in this method variant the $NH_3$ concentration is measured in the above-described fashion and used to decide when and to what extent the delivery of the second urea solution dose is activated. The higher the $NH_3$ concentration downstream of the SCR-combined diesel particulate filter, the more the urea solution dosing upstream of the SCR-combined diesel particulate filter is reduced until the $NH_3$ concentration falls below a relatively high threshold value which is dependent on the SDPF temperature and may be 40 ppm for example. When the $NH_3$ concentration falls below a second lower threshold value which is dependent on the SDPF temperature and may be 10 ppm for example the urea dosing amount is increased with the first urea solution dose.

The second urea solution dose may simultaneously be introduced therewith according to the $NO_x$ sensor signal downstream of the SCR-combined particulate filter. The higher the $NO_x$ signal, the higher the urea dose. The $NO_x$ sensor signal downstream of the SCR catalyst may be used for controlling the additional urea solution dosing for the correct storage of $NH_3$ in the SCR catalyst.

In some embodiments, a diesel engine has arranged in the exhaust tract of the diesel engine an SCR-combined diesel particulate filter in which an aqueous urea solution is introduced into the exhaust gas stream and an exhaust gas recirculation apparatus having an exhaust gas recirculation conduit branching off downstream of the diesel particulate filter for performing a low-pressure exhaust gas recirculation. The diesel engine is characterized in that it comprises means for measuring the $NH_3$ concentration in the exhaust gas downstream of the SCR-combined diesel particulate filter and means for reducing the low-pressure exhaust gas recirculation rate according to the measured $NH_3$ concentration.

In some embodiments, the diesel engine comprises means for correspondingly increasing the high-pressure exhaust gas recirculation rate. The means for measuring the $NH_3$ concentration in the exhaust gas downstream of the SCR-combined diesel particulate filter may comprise an $NH_3$ sensor for example.

In some embodiments, an additional SCR catalyst is arranged in the exhaust tract downstream of the SCR-combined diesel particulate filter. The exhaust gas recirculation conduit branches off from the exhaust tract between the SCR-combined diesel particulate filter and the additional SCR catalyst.

In some embodiments, the diesel engine has a first urea solution metering means upstream and a second urea solution metering means downstream of the SCR-combined diesel particulate filter.

In some embodiments, there is an $NO_x$ sensor arranged downstream of the SCR-combined diesel particulate filter and an $NO_x$ sensor arranged downstream of the SCR catalyst.

FIG. 1 shows a schematic representation of a diesel engine 1 having an exhaust tract 2. Those parts of the diesel engine not of interest for the invention described here have not been provided with reference numerals. Arranged furthest upstream in the exhaust tract 2 is a diesel oxidation catalyst 3 which may have a conventional configuration. Arranged downstream of the diesel oxidation catalyst 3 in the exhaust tract is an SCR-combined diesel particulate filter (SDPF) 4, which may be a customary diesel particulate filter having an integrated SCR catalyst. SCR here stands for selective catalytic reduction. Such an SCR-combined diesel particulate filter 4 operates as described at the outset, wherein a supplied aqueous urea solution in the catalyst brings about an extensive conversion of the exhaust gas into $CO_2$ and $NH_3$ and the produced ammonia reduces the nitrogen oxides ($NO_x$) in the exhaust gas to afford nitrogen ($N_2$) and water.

An SCR catalyst 5 which operates in the same way as described hereinabove is arranged in the exhaust tract downstream of the SCR-combined diesel particulate filter 4. A tank for an aqueous urea solution has the reference numeral 8. Two feeding means 7 run from the tank 8 to the exhaust tract 2, wherein the feeding means 7 comprise dosing means which inject the aqueous urea solution into the exhaust tract upstream of the SCR-combined diesel particulate filter 4 and of the SCR catalyst 5 respectively.

For emissions reduction, the diesel engine 1 further comprises an exhaust gas recirculation apparatus which has an exhaust gas recirculation conduit 11 which branches off from the exhaust tract 2 between the SCR-combined diesel particulate filter 4 and the SCR catalyst 5. The exhaust gas recirculation conduit 11 supplies a portion of the exhaust gas to the intake air of the diesel engine, thus bringing about a corresponding emissions reduction. Further sensors (lambda sensors, $No_x$ sensors, etc.) may be provided in the exhaust tract and shown in FIG. 1.

As mentioned hereinabove $NH_3$ is converted into $N_2$ and $H_2O$ in the SCR-combined diesel particulate filter 4. However, this is not necessarily the case in all operating modes and therefore undesired $NH_3$ can also exit the SCR-combined diesel particulate filter 4. There is therefore a danger that a portion of the $NH_3$ passing into the exhaust tract downstream of the diesel particulate filter 4 can enter the exhaust gas recirculation conduit 11 and thus be mixed with the intake air of the diesel engine. This is the case in low-pressure exhaust gas recirculation mode.

In order to largely prevent this there is in the exhaust tract 2 downstream of the SCR-combined diesel particulate filter 4 and upstream of the branching point of the exhaust gas recirculation conduit 11 an $NH_3$ sensor 6 which measures the $NH_3$ concentration in the exhaust gas downstream of the SCR-combined diesel particulate filter 4. When the measured $NH_3$ concentration exceeds a threshold value a control means (not shown) provided with the corresponding sensor signal reduces the low-pressure exhaust gas recirculation rate according to the measured $NH_3$ concentration, for example by gradually closing a valve means (not shown). This prevents $NH_3$ passing through the SCR-combined diesel particulate filter 4 from being admixed with the recirculated exhaust gas.

Furthermore, the $NH_3$ concentration measured by the $NH_3$ sensor 6 is used to decide when and to what extent the delivery of the second urea solution dose is activated. This second urea solution dose is injected into the exhaust gas stream via the second feeding means 7 shown on the right-hand side in FIG. 1 upstream of the SCR catalyst 5. The higher the $NH_3$ concentration downstream of the SCR-combined diesel particulate filter, the more the urea solution dosing upstream of the SCR-combined diesel particulate filter is reduced until the $NH_3$ concentration falls below a relatively high threshold value of for example 40 ppm. When $NH_3$ is then below a second low threshold value of for example 10 ppm the first urea solution feeding means can in turn increase the urea dosing amount.

Figure 2:
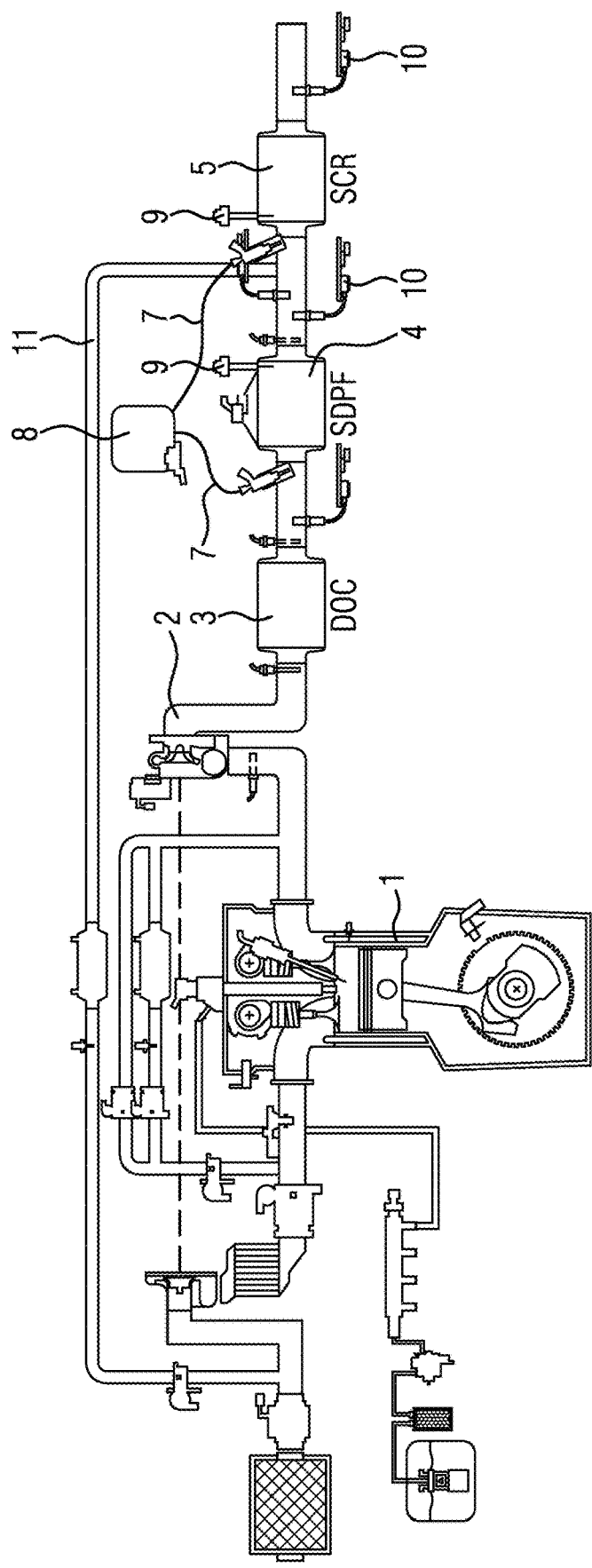
FIG. 2 shows a representation of another example embodiments incorporating teachings of the present disclosure.

FIG. 2 shows an embodiment of the teaching herein which the $NH_3$ concentration is likewise measured downstream of the SCR-combined diesel particulate filter 4. However, concentration measurement is achieved here not by means of an $NH_3$ sensor but by means of an $NO_x$ sensor 10 downstream of the SCR-combined diesel particulate filter 4 and an $NO_x$ sensor 10 downstream of the SCR catalyst 5. It is further noted that the SCR-combined diesel particulate filter 4 and the SCR catalyst 5 are each provided with an antenna sensor 9.

What is claimed is:

1. A method of operating a diesel engine having an exhaust tract and an SCR-combined diesel particulate filter in the exhaust tract an exhaust gas recirculation apparatus having an exhaust gas recirculation conduit branching off downstream of the SCR-combined diesel particulate filter for performing a low-pressure exhaust gas recirculation comprising:
   measuring an NH3 concentration in exhaust gas downstream of the SCR-combined diesel particulate filter and upstream of the exhaust gas recirculation conduit;
   upon exceeding a threshold value of the measured NH3 concentration, reducing the low-pressure exhaust gas recirculation rate based at least in part on the measured NH3 concentration;
   introducing a first urea solution dose into the exhaust tract upstream of the SCR-combined diesel particulate filter;
   introducing a second urea solution dose into the exhaust tract downstream of the SCR-combined diesel particulate filter and downstream of the exhaust gas recirculation conduit; and
   using the measured NH3 concentration to decide when and to what extent the delivery of the second urea solution dose is activated.

2. The method as claimed in claim 1, further comprising increasing a high-pressure exhaust gas recirculation rate of the diesel engine.

3. The method as claimed in claim 1, further comprising measuring the NH3 concentration in the exhaust gas using an NH3 sensor.

4. The method as claimed in claim 1, further comprising measuring the NH3 concentration in the exhaust gas by performing storage determination of an SCR catalyst arranged in the exhaust tract downstream of the SCR-combined diesel particulate filter in conjunction with a measurement from an NOx Sensor arranged downstream of the SCR-combined diesel particulate filter.

5. The method as claimed in claim 4, further comprising measuring the NH3 concentration in the exhaust gas by performing a measurement with a second NOx sensor downstream of the SCR-combined diesel particulate filter and downstream of the SCR catalyst.

6. The method as claimed in claim 1, further comprising measuring the NH3 concentration in the exhaust gas during supply of the aqueous urea solution to the SCR-combined diesel particulate filter or to the exhaust tract upstream thereof.

7. The method as claimed in claim 1, further comprising reducing the delivery of the first urea solution dose until the NH3 concentration is below a first threshold value.

8. The method as claimed in claim 1, further comprising increasing the urea dosing amount when the NH3 concentration is below a second threshold value.

9. The method as claimed in claim 1, further comprising introducing the second urea solution dose according to an NOx sensor signal downstream of the SCR-combined diesel particulate filter.

10. A diesel engine comprising:
    an exhaust tract;
    an SCR-combined diesel particulate filter arranged in the exhaust tract; and
    an exhaust gas recirculation apparatus including an exhaust gas recirculation conduit branching off downstream of the SCR-combined diesel particulate filter for performing a low-pressure exhaust gas recirculation;
    a sensor measuring a NH3 concentration in the exhaust gas downstream of the SCR-combined diesel particulate filter and upstream of the exhaust gas recirculation conduit;
    a first urea solution injector to dose urea into the exhaust tract upstream of the SCR-combined diesel particulate filter;
    a second urea solution injector to dose urea into the exhaust tract downstream of the SCR-combined diesel particulate filter and downstream of the exhaust gas recirculation conduit; and
    a controller programmed to reduce the low-pressure exhaust gas recirculation rate according to the measured NH3 concentration by adjusting a valve;
    wherein the controller is further programmed to assess the NH3 concentration to decide when and to what extent the second urea solution injector is activated.

11. The diesel engine as claimed in claim 10, wherein the controller is further programmed to correspondingly increase the high-pressure exhaust gas recirculation rate by adjusting a valve.

12. The diesel engine as claimed in claim 10, further comprising an SCR catalyst arranged in the exhaust tract downstream of the SCR-combined diesel particulate filter.

13. The diesel engine as claimed in claim 10, further comprising an NOx-Sensor downstream of the SCR-combined diesel particulate filter and downstream of the SCR catalyst.

* * * * *